(12) United States Patent
Udupi et al.

(10) Patent No.: US 9,367,344 B2
(45) Date of Patent: Jun. 14, 2016

(54) OPTIMIZED ASSIGNMENTS AND/OR GENERATION VIRTUAL MACHINE FOR REDUCER TASKS

(71) Applicant: CISCO TECHNOLOGY, INC., San Jose, CA (US)

(72) Inventors: Yathiraj B. Udupi, San Jose, CA (US); Debojyoti Dutta, Santa Clara, CA (US); Madhav V. Marathe, Cupertino, CA (US); Raghunath O. Nambiar, San Ramon, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 14/509,691

(22) Filed: Oct. 8, 2014

(65) Prior Publication Data

US 2016/0103695 A1    Apr. 14, 2016

(51) Int. Cl.
*G06F 9/455*    (2006.01)
(52) U.S. Cl.
CPC .. *G06F 9/45558* (2013.01); *G06F 2009/45562* (2013.01)
(58) Field of Classification Search
CPC  G06F 9/45558; G06F 9/45575; G06F 9/4806
USPC ............................................. 718/1, 100–107
See application file for complete search history.

(56) References Cited

U.S. PATENT DOCUMENTS

| | | | | |
|---|---|---|---|---|
| 5,519,867 | A * | 5/1996 | Moeller | G06F 9/4428 710/200 |
| 6,298,370 | B1 * | 10/2001 | Tang | G06F 9/5044 718/100 |
| 7,234,139 | B1 * | 6/2007 | Feinberg | G06F 9/45504 718/1 |
| 7,962,915 | B2 * | 6/2011 | Eshel | G06F 11/2025 714/2 |
| 8,276,145 | B2 * | 9/2012 | Papaefstathiou | G06F 9/485 718/102 |
| 8,276,148 | B2 * | 9/2012 | Cho | G06F 9/4881 705/7.26 |
| 8,375,386 | B2 * | 2/2013 | Hendel | G06F 9/45533 714/37 |
| 8,381,015 | B2 * | 2/2013 | Kaminski | G06F 9/5066 714/4.1 |
| 8,484,653 | B2 * | 7/2013 | Tsirkin | G06F 9/45533 709/220 |
| 8,544,004 | B2 * | 9/2013 | Fultheim | G06F 9/45533 718/1 |
| 8,645,966 | B2 * | 2/2014 | Andrade | G06F 9/50 718/104 |
| 8,806,486 | B2 * | 8/2014 | Martin | G06F 9/45533 709/231 |
| 8,909,785 | B2 | 12/2014 | Franco et al. | |
| 8,954,967 | B2 * | 2/2015 | Balmin | G06F 9/5066 718/100 |

(Continued)

OTHER PUBLICATIONS

Hwang et al, "Minimizing Cost of Virtual Machines for Deadline-Constrained MapReduce Applications in the Cloud", IEEE, pp. 130-138, 2012.*

(Continued)

*Primary Examiner* — Anil Khatri
(74) *Attorney, Agent, or Firm* — Patent Capital Group

(57) ABSTRACT

The present disclosure relates to assignment or generation of reducer virtual machines after the "map" phase is substantially complete in MapReduce. Instead of a priori placement, distribution of keys after the "map" phase over the mapper virtual machines can be used to efficiently reducer tasks in virtualized cloud infrastructure like OpenStack. By solving a constraint optimization problem, reducer VMs can be optimally assigned to process keys subject to certain constraints. In particular, the present disclosure describes a special variable matrix. Furthermore, the present disclosure describes several possible cost matrices for representing the costs determined based on the key distribution over the mapper VMs (and other suitable factors).

20 Claims, 4 Drawing Sheets

"M" MAPPER VMS
"N" KEYS => "N" REDUCER VMS (ASSUMPTION OF 1 REDUCER VM PER KEY)

(56) References Cited

U.S. PATENT DOCUMENTS

| | | | |
|---|---|---|---|
| 8,959,651 B2* | 2/2015 | Li | G06F 21/60 |
| | | | 726/26 |
| 8,972,986 B2* | 3/2015 | Palanisamy | G06F 9/5066 |
| | | | 718/1 |
| 8,997,107 B2* | 3/2015 | Jain | G06F 9/46 |
| | | | 709/223 |
| 2011/0219372 A1 | 9/2011 | Agrawal et al. | |
| 2012/0131139 A1 | 5/2012 | Siripurapu et al. | |
| 2012/0167101 A1 | 6/2012 | Kandula et al. | |
| 2013/0031559 A1 | 1/2013 | Alicherry | |
| 2013/0219068 A1 | 8/2013 | Ballani et al. | |
| 2013/0268672 A1 | 10/2013 | Justafort | |
| 2013/0290953 A1 | 10/2013 | Li et al. | |
| 2013/0339965 A1 | 12/2013 | Meng et al. | |
| 2014/0115168 A1 | 4/2014 | Yamashima et al. | |
| 2014/0143401 A1 | 5/2014 | Carlen | |
| 2014/0310712 A1 | 10/2014 | Meng et al. | |
| 2014/0380307 A1 | 12/2014 | Zhu et al. | |
| 2015/0127834 A1 | 5/2015 | Udupi et al. | |

OTHER PUBLICATIONS

Huang et al, "A Virtual Machine Consolidation Framework for MapReduce Enabled Computing Clouds", ACM, pp. 1-8, 2012.*

Arnold et al, "Improving Virtual Machine Performance Using a CrossRun Profile Repository", ACM, pp. 297-311, 2005.*

Nakajima et al, "Optimizing Virtual Machines Using Hybrid Virtualization" ACM, pp. 573-578, 2011.*

Arnold et al, "Active Covariance Matrix Adaptation for the (1+1)-CMA-ES", ACM, pp. 385-392, 2010.*

Hsieh et al, "Fast Coordinate Descent Methods with Variable Selection for Non-negative Matrix Factorization", ACM, pp. 1064-1072, 2011.*

USPTO Nov. 23, 2015 Non-Final Office Action from U.S. Appl. No. 14/242,131.

OpenStack Configuration Reference, May 10, 2015 docs.openstack.org; 665 pages.

"Using DRS Affinity Rules," VMware vSphere 5.1 Documentation Center; First published on or about Sep. 15, 2012; 8 pages https://pubs.vmware.com/vsphere-51/index.jsp#com.vmware.vsphere.resmgmt.doc/GUID-FF28F29C-8B67-4EFF-A2EF-63B3537E6934.html.

PCT Jan. 13, 2016 International Search Report and Written Opinion from PCT/US2015/054035.

U.S. Appl. No. 14/726,336, filed May 29, 2015, entitled "Optimized Hadoop Task Scheduler in an Optimally Placed Virtualized Hadoop Cluster Using Network Cost Optimizations," Inventor(s): Yathiraj B. Udupi.

U.S. Appl. No. 14/731,166, filed Jun. 4, 2015, entitled "Virtual Machine Placement Optimization With Generalized Organization Scenarios," Inventor(s): Yathiraj B. Udupi.

"Optimization with PuLP," Optimization with PuLP—PuLP v1.4.6 documentation, first published on or about Dec. 26, 2010; 1 page.

Fang, Weiwei, et al., "VMPlanner: Optimizing virtual machine placement and traffic flow routing to reduce network power costs in cloud data centers," Computer Networks, vol. 57, Issue 1, Jan. 16, 2013, pp. 179-196.

Gibizer,Balasz, "API: Add soft-affinity policy for server-group," OpenStack Compute (Nova); Blueprints, Apr. 30, 2014, 2 pages https://blueprints.launchpad.net/nova/+spec/soft-affinity-for-server-group.

Gu, Rong, et al., "SHadoop: Improving MapReduce performance by optimizing job execution mechanism in Hadoop clusters," Journal of Parallel and Distributed Computing vol. 74, Issue 3, Mar. 2014, pp. 2166-2179.

Herodotou, Herodotos, et al., "Profiling, What if Analysis, and Cost based Optimization of MapReduce Programs," The 37th International Conference on Very Large Data Bases, Aug. 29, Sep. 3, 2011, Seattle, Washington; 12 pages.

Jiang, Joe Wenjie, et al., "Joint VM Placement and Routing for Data Center Traffic Engineering," INFOCOM 2012, Mar. 25-30, 2012, Orlando, FL; 9 pages.

Kambatla, Karthik, et al., "Towards Optimizing Hadoop Provisioning in the Cloud," HotCloud'09 [2009 conference on Hot topics in cloud computing], Jun. 14-19, 2009; 5 pages.

Kondikoppa, Praveenkumar, et al., "Network-Aware Scheduling of MapReduce Framework on Distributed Clusters over High Speed Networks," Workshop on Cloud Services, Federation, and the 8th Open Cirrus Summit, Sep. 21, 2012, San Jose, CA, USA; 6 pages.

Korupolu, Madhukar, et al., "Coupled Placement in Modern Data Centers," IPDPS '09 Proceedings of the 2009 IEEE International Symposium on Parallel&Distributed Processing, May 23, 2009, pp. 1-12.

Li, Xin, et al., "Let's Stay Together: Towards Traffic Aware Virtual Machine Placement in Data Centers," INFOCOMM 2014, Las Vegas, NV, Jun. 14-24, 2014; 9 pages.

Lindgren, Hans, "Performance Management for Cloud Services: Implementation and Evolution of Schedulers for OpenStack," Communication Networks School of Electrical Engineering, Master's Degree Project, Jul. 2013, 50 pages.

Liu, Shengyuan, et al., "Evaluating Task Scheduling in Hadoop-based Cloud Systems," 2013 IEEE International Conference on Big Data, Oct. 6-9, 2013, Santa Clara, CA; 6 pages.

Meng, Xiaoqiao, et al., "Improving the Scalability of Data Center Networks with Traffic-aware Virtual Machine Placement," Israel Institute of Technology, 236635—On the Management and Efficiency of Cloud Based Services, Dec. 8, 2010; 39 pages.

Meng, Xiaoqiao, et al., "Improving the Scalability of Data Center Networks with Traffic-aware Virtual Machine Placement," IEEE INFOCOM 2010, Mar. 14-19, 2010; 9 pages.

Pachorkar, Nilesh, et al., "Multi-dimensional Affinity Aware VM Placement Algorithm in Cloud Computing," International Journal of Advanced Computer Research, vol. 3 No. 4 Issue-13, Dec. 2013; 5 pages.

Bonde, Dhaval, "Techniques for Virtual Machine Placement in Clouds, MTP Stage 1 Report," Submitted in partial fulllment of the requirements for the degree of Master of Technology, Department of Computer Science and Engineering Indian Institute of Technology, Bombay Mumbai 2010; 18 pages.

Qin, Peng, et al., "Bandwidth-Aware Scheduling with SDN in Hadoop: A New Trend for Big Data," Mar. 12, 2014; Cornell University Library; arXiv:1403.2800v1 [cs.DC]; submitted on Mar. 12, 2014; 8 pages.

Sandholm, Thomas, et al., "MapReduce Optimization Using Regulated Dynamic Prioritization," SIGMETRICS/Performance'09, Jun. 15-19, 2009, Seattle, WA, USA.

Sonnek, Jason, et al., "TR 09-030 Technical Report—Starling: Minimizing Communication Overhead in Virtualized Computing Platforms Using Decentralized Affinity-Aware Migration," Department of Computer Science and Engineering, University of Minnesota, Dec. 2, 2009.

Tang, Xia, et al., "A Reduce Task Scheduler for MapReduce with Minimum Transmission Cost Based on Sampling Evaluation," International Journal of Database Theory and Application vol. 8, No. 1 (2015), pp. 1-10; Feb. 2015 http://dx.doi.org/10.14257/ijdta.2015.8.1.0.

Yan, Cairong, "Affinity-aware Virtual Cluster Optimization for MapReduce Applications," 2012 IEEE International Conference on Cluster Computing (CLUSTER), Sep. 24-28, 2012; 9 pages.

* cited by examiner

"M" MAPPER VMS
"N" KEYS => "N" REDUCER VMS (ASSUMPTION OF 1 REDUCER VM PER KEY)

|  | Key1 | Key2 | Key3 |
|---|---|---|---|
| Mapper 1 | 10000 | 15 | 30 |
| Mapper 2 | 100000 | 1000 | 5000 |
| Mapper 3 | 20 | 50000 | 50000 |

OPTIMIZED ASSIGNMENTS AND/OR GENERATION VIRTUAL MACHINE FOR REDUCER TASKS

TECHNICAL FIELD

This disclosure relates in general to the field of computing and, more particularly, to systems and methods for providing optimized virtual machine assignments to reducer tasks.

BACKGROUND

Computer networking technology allows execution of complicated computing tasks by sharing the work among the various hardware resources within the network. This resource sharing facilitates computing tasks that were previously too burdensome or impracticable to complete. For example, the term "big data" has been used to describe data sets that are extremely large and complex, making them difficult to process. Many implementations of computing and networking technologies have been devised to process big data. One commonly used operation for operating on these large datasets is MapReduce. In one example, MapReduce used with Hadoop (framework for distributed computing) can allow writing of applications which process vast amounts of data (multi-terabyte data-sets) in-parallel on large clusters (thousands of nodes) of commodity hardware in a reliable, fault tolerant manner. When working in a virtualized environment (e.g., OpenStack Cloud Infrastructures), MapReduce can be implemented using many virtual machines distributed on physical hosts. Processing these large datasets is computationally intensive, and taking up resources in a data center can be costly.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 4 shows an exemplary variable matrix X, according to some embodiments of the disclosure;

FIG. 5 shows a key distribution matrix D, according to some embodiments of the disclosure;

FIG. 6 shows a network distance matrix C, according to some embodiments of the disclosure.

DETAILED DESCRIPTION OF EXAMPLE EMBODIMENTS

Overview

Figure 1:
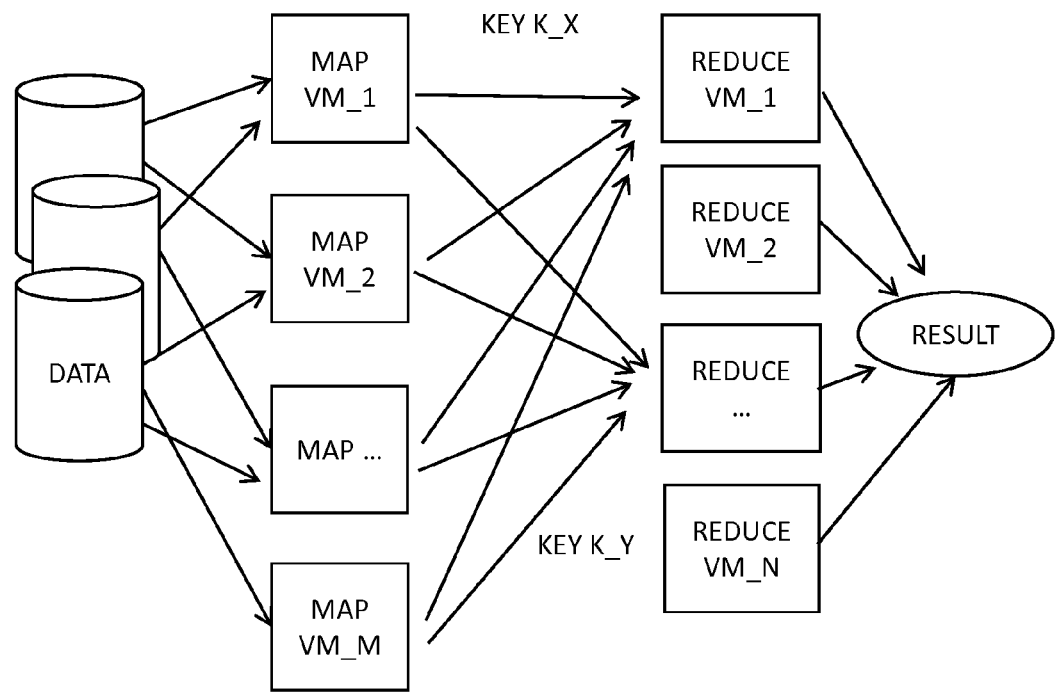
FIG. 1 illustrates the process for MapReduce having map tasks and reducer tasks being performed in a virtualized computing environment, according to some embodiments of the disclosure.

The present disclosure relates to assignment or generation of reducer virtual machines (VMs) after the "map" phase is substantially complete in MapReduce. Instead of a priori placement, distribution of keys after the "map" phase over the mapper virtual machines can be used to efficiently place reducer tasks to virtual machines in virtualized cloud infrastructure like OpenStack. By solving a constraint optimization problem, reducer VMs can be optimally assigned to process keys subject to certain constraints. In particular, the present disclosure describes a special variable matrix. Furthermore, the present disclosure describes several possible cost matrices for representing the costs determined based on the key distribution over the mapper VMs (and other suitable factors).

In some embodiments, a method for determining virtual machine assignments for reducer tasks on physical hosts (sometimes referred to as a "partitioning method") can include determining a distribution of keys over mapper virtual machines after map tasks are complete, determining costs associated with possible assignments of virtual machines to reducer tasks on the keys based on the distribution of keys; and solving for assignments of virtual machines to the reducer tasks based on the costs and subject to one or more constraints. In other words, the assignment of virtual machines to reducer tasks can be formulated as a constraints optimization problem, where one or more optimal or desirable solutions may exist. From the solution(s), a solution can be selected which may provide the optimal assignment of virtual machines to reducer tasks, or at least an assignment that is better than other possible assignments. Furthermore, the costs associated with possible assignments of virtual machines to reducer tasks comprises, for each possible virtual machine and for each reducer task, a cost for the particular possible virtual machine to perform the particular reducer task. These costs can in some cases be computed based on the distribution of keys.

Advantageously, the resulting optimized assignment of VMs to reducer tasks can utilize resources in the data center more efficiently, and in some cases, allow MapReduce to be completed faster than a priori placements of reducer VMs. In particular, the distribution of keys provide some guidance for the optimization, such that certain costs in the data center for a given set of assignments of reducer VMs can be determined and minimized. Generally speaking, the distribution of keys over the mapper virtual machines comprises, for each key and for each mapper virtual machine, a number of key-value pairs for the particular key stored with the particular mapper virtual machine.

In some embodiments, the method can not only determine assignments of mapper virtual machines (VMs used as mappers in the "map" phase) to reducer tasks, the method can also determine assignments of virtual machines to be created on available physical hosts to reducer tasks. In particular, the partitioning method determines optimized assignments from possible assignments (i.e., solves for substantially optimized assignments of virtual machines) by using a specialized variable matrix defining the possible assignments. Specifically, the variable matrix can have dimensions of at least n by (M+p*q), where n is the number of keys, M is the number of mapper virtual machines, p is n−M, and q is the number of available physical hosts on which a virtual machine can be created.

Broadly speaking, the partitioning method assesses the costs for various possible assignments of reducer VMs to reducer tasks by computing, for each virtual machine and for each reducer task, a cost for performing the particular reducer task for a particular key using a particular virtual machine based on the distribution of keys over the mapper virtual machines. In some embodiments, other factors are used for computing the cost. These factors can include one or more of the following: network distance(s) from the virtual machine(s) on which the key-value pairs for the particular key is stored to the particular virtual machine performing the reducer task for the particular key, processor utilization of the particular virtual machine performing the reducer task for the particular key, memory utilization of the particular virtual machine performing the reducer task for the particular key, bandwidth availability(-ies) of the communication path from the virtual machine(s) on which the key-value pairs for the particular key is stored to the particular virtual machine performing the reducer task for the particular key, and disk input/output speeds of the particular virtual machine performing the reducer task for the particular key.

To limit the possible assignments, the partitioning method is configured with one or more constraints. These constraints can advantageously implement certain rules and policies on the possible assignments, as well as ensuring the solution to the optimization problem is a correct one. In one example, the one or more constraints includes the following: (1) a virtual machine is assigned to at most one reducer task, (2) a reducer task for a particular key is assigned to only one virtual machine, and (3) if a reducer task is assigned to a virtual machine to be created on a physical host, the virtual machine is created on only one physical host. In another example where the constraints are relaxed (e.g., if a virtual machine is capable of performing up to a predefined number of reducer task(s)), the one or more constraints can include the following: (1) a reducer task for a particular key is assigned to only one virtual machine, and (2) if a reducer task is assigned to a virtual machine to be created on a physical host, the virtual machine is created on only one physical host.

EXAMPLE EMBODIMENTS

Understanding Basics of MapReduce in a Virtualized Environment

A MapReduce job (e.g., as a Hadoop workload) usually splits the input data-set into independent chunks to be processed in parallel manner. The job has two main phases of work—"map" and "reduce"—hence MapReduce. In the "map" phase, the given problem is divided into smaller subproblems, each mapper then works on the subset of data providing an output with a set of (key, value) pairs (or referred herein as key-value pairs). In the "reduce" phase, the output from the mappers is handled by a set of reducers, where each reducer summarizes the data based on the provided keys. When MapReduce is implemented in a virtualized environment, e.g., using OpenStack cloud infrastructure, the mappers and reducers are provisioned as virtual machines ("VMs" or sometimes referred to as virtual compute nodes) on physical hosts.

FIG. 1 illustrates the process for MapReduce having map tasks and reducer tasks being performed in a virtualized computing environment, according to some embodiments of the disclosure. First, data is provided to M mapper VMs (shown as MAP VM_1, MAP VM_2, . . . MAP VM_M) to perform the respective mapper tasks. During the MapReduce job, all the map tasks may be completed before reducer tasks start. Once the mapper tasks are complete, output from the mapper VMs can have N keys. For reduce, key-value pairs with the same key ought to end up at (or be placed at/assigned to) the same reducer VM. This is called partitioning. In one example, it is assumed one reducer VM performs reducer task for one key. The example would have N reducer VMs (shown as REDUCE VM_1, REDUCE VM_2, . . . REDUCE VM_N).

A MapReduce system usually provides a default partitioning function, e.g., hash(key) mod R to select a reducer VM for a particular key. However, due to the effects of lopsided key distributions, multi-tenancy, network congestion, etc., such a simple partition function can cause some of the reducer VMs to take excessively long time, thus delaying the overall completion of the job. For at least that reason, the placement VMs in a physical topology of hosts/servers and their assignments to reducer tasks can play an important role in deciding the performance of such workloads.

Improved Partitioning Method

The present disclosure describes an improved partitioning method which can determine virtual machine assignments for reducer tasks on physical hosts to enable faster as well as balanced completion of all the reducer tasks. In some embodiments, the improved partitioning method can address how to make optimized placements of the reducer VMs in a virtualized Hadoop environment on cloud infrastructures such as OpenStack. The improved partitioning method can perform technical tasks such as improve load balancing among the reducer VMs (and the hosts on which the reducer VMs are provided), determine whether to create new reducer VMs and how many, which host to place the new reducer VMs, etc.

Figures 2, 3:
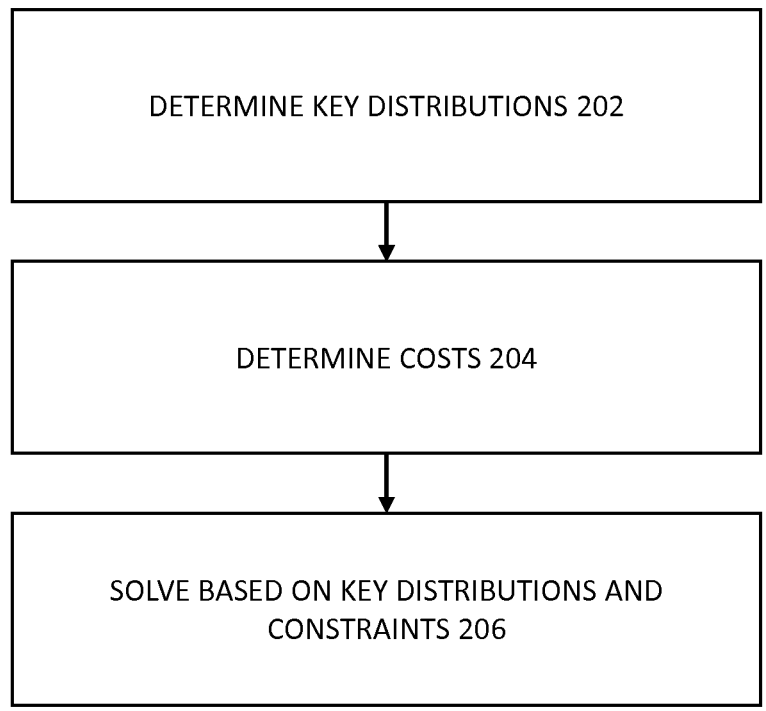
FIG. 2 shows an exemplary flow diagram illustrating a method for determining virtual machine assignment for reducer tasks on physical hosts, according to some embodiments of the disclosure.
FIG. 3 illustrates a distribution of keys over mapper virtual machines after map tasks are complete, according to some embodiments of the disclosure.

FIG. 2 shows an exemplary flow diagram illustrating an improved partitioning method for determining virtual machine assignments for reducer tasks on physical hosts, according to some embodiments of the disclosure. Once the map tasks are complete, the partitioning method determines a distribution of keys over mapper virtual machines (box 202). Based on the distribution of keys, the partitioning method determines costs associated with possible assignments of virtual machines to reducer tasks on the keys (box 204). Based on the costs, the partitioning method solves for substantially optimized assignments of virtual machines to the reducer tasks subject to one or more constraints (box 206).

The flow diagram illustrates that the improved partitioning method solves a constraints optimization problem to determine optimal assignments of VMs to reducer tasks. This can be done by minimizing cost based on the distribution of keys in view of one or more constraint(s). It is envisioned by the disclosure that an equivalent implementation may solve the problem by maximizing another metric (as opposed to minimizing cost).

Distribution of Keys after Map Tasks are Done and Exemplary Assignments of Reducer VMs Based on the Distribution of Keys One interesting feature of the improved partitioning method is that the method uses the distribution of keys as part of the cost function of the constraints optimization problem when optimizing the assignment of reducer VMs. The distribution of keys is an important factor in partitioning because the transfer and processing of these keys in a virtualized cloud infrastructure can take up a lot of network and computing resources. The network and computing resources needed for performing a reducer task is directly related to the cost for a particular reducer VM to perform the reducer task. The distribution of keys over the mapper virtual machines would generally include, for each key and for each mapper VM, a number of key-value pairs for the particular key stored with the particular mapper VM (on the physical host of the VM). The distribution of keys provide information relating to where the keys are stored, such that costs for transferring and/or processing these keys on certain reducer VMs can be determined.

FIG. 3 illustrates a distribution of keys over mapper VMs after map tasks are complete, according to some embodiments of the disclosure. In this example, the table or matrix has the mapper VMs (Mapper 1, Mapper 2, Mapper 3) represented as rows. The columns show the counts/numbers of how many key-value pairs having a particular key are stored with a particular mapper VM. In this example, Key1 has 10000 key-value pairs with Mapper 1, 100000 key-value pairs with Mapper 2, and 20 key-value pairs with mapper 3. It is envisioned that other kinds of numbers can be used to represent distribution of keys (e.g., percentages, fractions, scores, sizes, etc.)

Considering the example of distribution of keys shown in FIG. 3, possible assignments of reducer VMs to reduce these keys are:

- Assign the same VM that was used as Mapper 2 as the reducer VM for Key1 (because many key-value pairs of Key1 is already with Mapper 2),
- Assign the same VM that was used as Mapper 3 as the reducer VM for Key2 (because many key-value pairs of Key 2 is already with Mapper 3), and
- Assign the same VM that was used as Mapper 1 as the reducer VM for Key3 (because the VM used as Mapper 1 is not busy).

The above exemplary assignments can ensure that the amount of data that has to be moved from the mappers to reducers is minimized or reduced. In this example, these assignments can be determined based on which VM had the most key-value pairs for a particular key, which can directly relate to the cost of moving the data from mappers to reducers.

Note it can be seen in the above example related to FIG. 3 that the reducer for Key3 could have been run on the same VM used as Mapper 3 since that VM used as Mapper 3 also has a large number of Key3 key-value pairs. So solution to the optimization can vary depending on how the cost is defined.

Defining the Constraint Optimization Problem: A Basic Setup

In order to efficiently manage the sharing of these complex computing tasks, available computing and network resources should be intelligently allocated. To find optimal placement, the method solves a constraints optimization problem by minimizing costs to find the optimal solution subject to resource constraints. Specifically, the costs can be determined based on at least the distribution of keys over the mapper VMs. This optimal solution, once found, can be used by the compute VM schedulers such as OpenStack compute scheduler while deciding which physical host to use to either spin up a VM or to reuse an existing mapper VM on that host. In some embodiments, an aggregate cost can be a measure of computational and network resources consumed for completing a particular reducer task on a particular VM, which also is an indication of the total time taken by that particular reducer task on the particular VM. By minimizing this aggregate cost, it is possible to solve for one or more optimal assignments of reducer VMs to reducer tasks.

In a simplified embodiment, the optimization assumes there will be one reducer VM per key, and if there are more keys currently being output by mapper VMs than there are Mapper VMs, additional VMs can be created. Later in the present disclosure, a more complicated embodiment is described where the optimization problem does not have the assumption of one key per one reducer VM, where the partitioning method can allow for more than one key per reducer VM.

Referring back to the simplified embodiment where the partitioning method assumes one key per one reducer VM, the constraints optimization problem is reduced to finding the optimal solution of deciding which VM should be used for performing a particular reducer task for a particular key based on the key distribution. Broadly speaking, determining a solution to the assignment problem is not trivial. Many factors besides key distribution can affect the cost of assigning a particular reducer VM to perform a reducer task for a particular key.

The costs associated with possible assignments of virtual machines to reducer tasks can include, for each possible virtual machine and for each reducer task, a cost for the particular possible virtual machine to perform the particular reducer task. Such a cost can be computed based on one or more of the following:

- The amount of data to be transferred between the mapper VM and the particular reducer VM based on the distribution of keys over the mapper VMs (related to the amount of time and bandwidth required to transfer the key-value pairs to the particular reducer VM thus affecting the cost of performing the particular reducer task);
- Network distance(s) from the virtual machine(s) on which the key-value pairs for the particular key is stored to the particular virtual machine performing the reducer task for the particular key (related to the amount of time required to transfer the key-value pairs to the particular reducer VM thus affecting the cost of performing the particular reducer task;
- Processor utilization of the particular virtual machine (on a physical host) performing the reducer task for the particular key (lower utilization generally means lower cost of performing the particular reducer task using the particular reducer VM);
- Memory utilization of the particular virtual machine performing the reducer task for the particular key (lower utilization generally means lower cost of performing the particular reducer task using the particular reducer VM);
- Bandwidth availability(-ies) of the communication path from the virtual machine(s) on which the key-value pairs for the particular key is stored to the particular virtual machine performing the reducer task for the particular key (higher bandwidth generally means lower cost and better network utilization for transferring the key-value pairs); and
- Disk input/output speeds of the particular virtual machine performing the reducer task for the particular key (higher speeds generally mean lower cost and faster execution of the reducer task).

Defining the Variable Matrix X

In view of all these varied factors, a constraint solver can effectively solve the problem of reducer VM assignments and generation. Specifically, the constraint solver can use a variable matrix (in combination with one or more cost matrices) and solve for one or more optimal solutions subject to one or more constraints. The mechanics of the constraint solver searches through the different possible instances of the variable matrix (subject to the one or more constraints) to determine which one (or more) of the instances would result in the lowest costs (or lowered costs).

Figures 4, 5, 6:
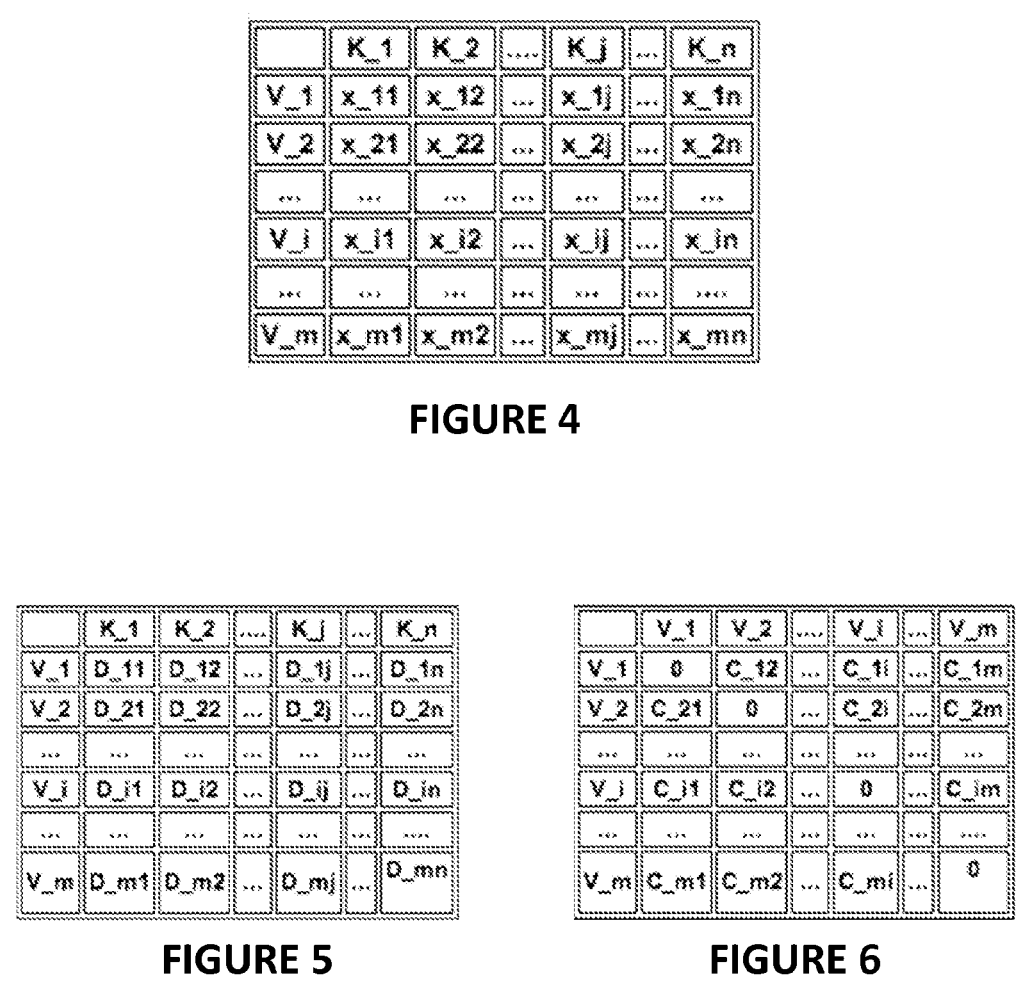

FIG. 4 shows an exemplary variable matrix X, according to some embodiments of the disclosure. Each entries in the matrix is denoted by $x\_ij$, where i ranges from 1 to m, and j ranges from 1 to n. Given n Keys, the improved partitioning method aims to determine n Reducer VMs that can be assigned to reduce the n Keys. There are also M (existing) mapper VMs, which are VMs that are already existing and placed in certain physical hosts. Hence each of these M mapper VMs can be represented by one row each in the variable matrix. However, when M is less than n, $p=n-M$ number of additional VMs should be created. To accommodate p additional VMs to be created on physical hosts (where $p=n-M$), the variable matrix includes further rows for these additional VMs. Depending on q available hosts, the variable matrix can include up to p*q new rows in the variable matrix (or some other prescribed number of possible additional VMs to be created). In other words, the p*q rows indicate the option of each of these new VMs to potentially have q host options of where they can be created. The result is a variable matrix with m number of rows, where m=M+p*q. Phrased differently, the variable matrix has dimensions of at least n by (M+p*q), where n is the number of keys, M is the number of mapper virtual machines, p is n−M, and q is the number of available physical hosts on which a virtual machine can be created.

Referring back to FIG. 4, each variable $x_{ij}$ in the variable matrix is 1 if a reducer for key $K\_j$ selects the VM denoted by the $V\_i$. $V\_i$ is either one of the existing Mapper VMs, or a new VM to be created on one of the q available hosts. For all $V\_i$ that is a non-mapper new VM to be created, it is possible to know which host the new VM can be created in, based on which variable row it is. (In terms of mathematics: for i>M, (i−M) % q can give the host that $V\_i$ corresponds to, where M is number of Mappers, q is the number of hosts, and % is the modulo (reminder) operator.)

Advantageously, this variable matrix setup involving multiple VM rows for existing VMs and all the additional VMs required allows us to mathematically solve for the best solution, including giving an opportunity for a physical host to create more than one VMs.

First Set of Exemplary Constraints

The possible instances of the variable matrix X is limited by one or more constraints, generally business rules/policies may govern how many VMs can be created on one host, or how many reducer tasks a reducer VM can perform. For that reason, one or more constraints are provided to limit the possible instances of the variable matrix X.

Referring back to the simplified embodiment, there can be three constraints: (A1) a virtual machine is assigned to at most one reducer task; (A2) a reducer task for a particular key is assigned to only one virtual machine; and (A3) if a reducer task is assigned to a virtual machine to be created on a physical host, the virtual machine is created on only one physical host.

The first constraint (A1) requires that for VM rows (mapper VMs and non-mapper VMs to be created) in the variable matrix X, the sum of the $x\_ij$ values is less than or equal to 1. This constraint means there is at most one reducer task for a particular key per reducer VM. The constraint A1 can be summarized below:

Constraint A1
For all VM rows
add constraint: $Sum(x\_ij) \leq 1$ for j=[1, n]
The ≤ is used to accommodate the scenarios when there are lesser keys than the number of mapper VMs (e.g., when n<M, some mapper VMs may not be used as a reducer VM)

The second constraint (A1) requires that for all VM rows and all keys, the sum of the column should equal to 1. This constraint means that a key can be reduced by only one VM at a time. The constraint A2 can be summarized below:
Constraint A2
For all keys, i.e., all values of j,
add constraint $Sum(x\_ij)=1$ for i=[1, m]

The third constraint (A3) requires that for the additional VMs to be created, a VM is created in only one host. To explain this constraint, consider the following example. Suppose there are two additional VMs needed (p=2), there are 2 available hosts (q=2), and there are 2 keys (n=2). The rows and columns in the variable matrix for these VMs are as follows:

|      | K_1 | K_2 |
|------|-----|-----|
| V_11 | x1  | x2  |
| V_12 | X3  | X4  |
| V_21 | X5  | X6  |
| V_22 | X7  | X8  |

Here V_11 indicates the first VM on the first Host, V_12 indicates the first VM on the second Host, and so on. So the first VM can be created in Host 1 or Host 2, and it can be linked to one Key only. Hence the constraint for Host 1 would be: x1+x2+x3+x4=1. At any point of time only one value of the variables: x1, x2, x3, or x4 can be 1, indicating only one host is chosen for that VM, and only one key is selected for that VM. Similarly the constraint for the second Host would be: x5+x6+x7+x8=1. The constraint A3 can be summarized below for all VM rows corresponding to the same VM and all possible Hosts:

Constraint A3
For every additional VM (p total) required,
add constraint $Sum(x\_ij)=1$, for all values of i corresponding to the same VM, for all keys j=[1, n], i.e., all the VM rows in the variable matrix corresponding to the current VM.
Note that the constraint set A3 only means that a single VM can be associated to only one host, but it does not mean that a single host cannot actually create multiple VMs (which is not a constraint)

While the present disclosure focuses on several simple constraints (assuming all hosts are capable of creating new VMs), it is understood by one skilled in the art that in some situations the computational resource constraints (or rules/policies) on hosts can limit creating these VMs. In these situations, further constraints can be made to limit which hosts can actually create new VMs, and how many VMs can be created on one host.

Determining the Cost Matrices

The costs associated with a particular reducer VM performing a particular reducer task can be stored in a cost matrix. Determining the costs associated with the possible assignments of virtual machines to reducer tasks can include computing, for each virtual machine and for each reducer task, a cost for performing the particular reducer task for a particular key using a particular virtual machine based on the distribution of keys over the mapper virtual machines. It is possible to compute more than one cost matrices, and a function can be provided to compute the aggregate cost based on (an instance of) the variable matrix X, and the one or more cost matrices. The following example shows cost matrices defined based on distribution of keys and network distances between hosts.

To represent distribution of keys as part of the cost, a key distribution matrix D can be defined. FIG. 5 shows a key distribution matrix D, according to some embodiments of the disclosure. An entry in the matrix D, $D\_ij$, represents the number of values for Key $K\_j$ generated by VM $V\_i$. In this example, for the non-Mapper VM variables (the additional VMs to be generated), the corresponding values of keys are zeros.

To represent the network distance as part of the cost, a network distance matrix C can be defined. FIG. 6 shows a network distance matrix C, according to some embodiments of the disclosure. An entry in the network distance matrix C, $C\_ab$, indicates the network distance between the VMs $V\_a$ and $V\_b$. Here note that $C\_ii$ is zero, and $C\_ab=C\_ba$.

The aggregate cost can depend on the network distance, the amount of data to be transferred between the VM which is chosen for the reducer task of a particular key, and the other VMs from which the data for that key is to be transferred. As an example for Key K_1, if VM V_1 is the chosen VM, then this contributes the following value to the final sum of aggregate costs: $x\_11*[D\_21*C\_21+D\_31*C\_31+ \ldots D\_i1*C\_i1+ \ldots +Dm1*C\_m1]$. It is understood that other formulations can be used, depending on the application. The sum of aggregate costs thus gives a measure of the cost of moving all the data for this key from the other VMs to this actual selected VM for the Reducer task of that key to perform the reducer task. To minimize the costs over many possible assignments, the partitioning method adds cost values for all possible variables to form the final aggregate cost metric to minimize on:

```
Function aggregate_cost (Set of all x_ij, Matrix D, Matrix C)
    cost = 0
    for every x_ij in Set of all x_ij for i in [1,m], and j in [1,n]
        cost_multiple_sum = 0
        for every k in [1,m]
            if k is not equal to i
                cost_multiple_sum = cost_multiple_sum + D_kj * C_kj
        cost = cost + x_ij * cost_multiple_sum
    return cost
```

To summarize, the above example describes the constraints optimization problem with the cost objective function, and the constraints, where the variables indicate which key corresponds to which VM, and the host selection of the additional non-Mapper VMs, with the assumption of one key per reducer VM:
Minimize aggregate_cost(Set of all x_ij, Matrix D, Matrix C)
Subject to constraints A1, A2 and A3.

The above example illustrates the determination of a cost matrix, which can take can take into account one or more factors. It is envisioned that other factors can also be used for determining the costs in the cost matrix. For example, the cost can depend on how busy the various physical machines running these VMs are as well as on the network distance and bandwidth availability between these nodes. In other words, the existing processor/network loads can impact costs.

In some cases, one or more factors can result in creating a new VM on an entirely different physical host if that will reduce the longest reducer completion time. In other words, the possible assignments of virtual machines to the reducer tasks comprises assignments of the mapper virtual machines to reducer tasks and assignments of virtual machines to be created on available physical hosts to reducer tasks.

A Second Set of Exemplary Constraints

One skilled in the art would appreciate that the constraints can be modified depending on the application. For instance, in some embodiments, a reducer task can handle more than one key, in other words, a virtual machine can be assigned to any number of reducer tasks (or some other predefined number of reducer tasks). The corresponding constraints can include (A2) a reducer task for a particular key is assigned to only one virtual machine; and (A3_new) if a reducer task is assigned to a virtual machine to be created on a physical host, the virtual machine is created on only one physical host. Note that constraint A3_new is a modified version of constraint A3 due to the relaxation of constraints, the mathematics for the constraint is to be defined slightly differently.

To accommodate this relaxation in the constraints, it is possible to provide a second set of exemplary constraints (in place of the first set, while keeping the same or similar cost matrices as described above). Since constraint A1 from the first set is no longer applicable, it will not be used. However, constraint A2 from the first set is still applicable (requiring a single key is reduced by only one VM at a time). Constraint A3 from the first set which was used to indicate the host selection and placement for all the additional non-mapper VMs, can be adjusted (as constraint A3_new) to take into consideration that a VM can handle more than one key, but still with the constraint of one host per VM. Referring back to the example with two additional VMs, 2 possible hosts to select from and 2 keys, the variable matrix is:

|      | K_1 | K_2 |
|------|-----|-----|
| V_11 | x1  | x2  |
| V_12 | X3  | X4  |
| V_21 | X5  | X6  |
| V_22 | X7  | X8  |

The constraint A3_new is thus applicable for the first VM variable rows—V_11, and V_12 (indicating VM in first host or second host), where:
$0 \leq x1+x3 \leq 1$
$0 \leq x2+x4 \leq 1$
$0 \leq x1+x4 \leq 1$
$0 \leq x2+x3 \leq 1$ (for the first VM)

Here in the constraint A3_new, x1+x3 can be at most 1, but can also be 0, indicating only one host is chosen for the VM if that particular key is chosen for that VM or not.

Similarly for the second VM, where the constraint A3_new prescribes:
$0 \leq x5+x7 \leq 1$
$0 \leq x6+x8 \leq 1$
$0 \leq x5+x8 \leq 1$
$0 \leq x6+x7$ (for the second VM)

If there are a maximum of p potential additional VMs to be added and there are q host options, and there are n keys, to generalize, for every additional VM of the p additional VMs required, a constraint is placed for every combination of two variables, one from one VM row, and another from any of the (q−1) VM variable rows we have for that specific VM. In the above example, the combinations were:
(x1, x3), (x1, x4), (x2, x3), (x2, x4) for the first VM, and
(x5, x7), (x5, x8), (x6, x7), (x6, x8), for the second VM.

Hence for every combination represented as (a, b), the constraint can be $0 \leq a+b \leq 1$. To summarize, constraint A3_new is as follows:
Constraint set A3_new
for each additional VM "V" from the maximum set of p additional VMs potentially required, for every possible combination (a, b), where "a" represents any one variable in one VM row, and "b" represents any one variable in any of the (q−1) remaining VM variable rows for the current VM (one of possible p),
add constraint $0 \leq (a+b) \leq 1$ To summarize, the above example describes the constraints optimization problem with the cost objective function, and the constraints, where the variables indicate which key corresponds to which VM, and the host selection of the additional non-Mapper VMs, with the assumption of one key per reducer VM:
Minimize aggregate_cost(Set of all x_ij, Matrix D, Matrix C)
Subject to constraints A2 and A3_new.

System Overview

Cloud infrastructure may support independent resource placement (i.e., scheduling) decisions internally among the components such as Nova (compute), Cinder (block storage), and Neutron (networking) (other exemplary components include Swift (Object Storage), Sahara (Elastic MapReduce). Because of the independent decisions, say made by the Nova-scheduler and the Cinder-scheduler, there is a good possibility for the two hosts selected for VM and volume to reside in different racks and hence consuming a good amount of traffic bandwidth, leading to a non-optimal resource placement.

Existing scheduling mechanisms support handling simple constraints. However, there are no guarantees of providing a globally optimal solution and computing platforms generally do not handle complex optimization constraints that could not only involve state variables local to the service, but also from the other services, covering all the resources—compute, storage, and network. Tenants can have complex business rules and policies that govern the data center resources, and the resource placement decisions (i.e., partitioning in the case of MapReduce) should consider these requirements. For example, tenants may expect all the storage to reside locally where the compute is, or may expect to minimize the network bandwidth usage. There could be also be cost-related business rules on what kinds of instances to schedule depending on the time (thus affecting cost function definitions). Tenant policies may also request to minimize the distance. Advantageously, the improved partitioning method can address any one or more of these tenant specifications while solving for optimized assignments of VMs to reducer tasks.

Figure 7:
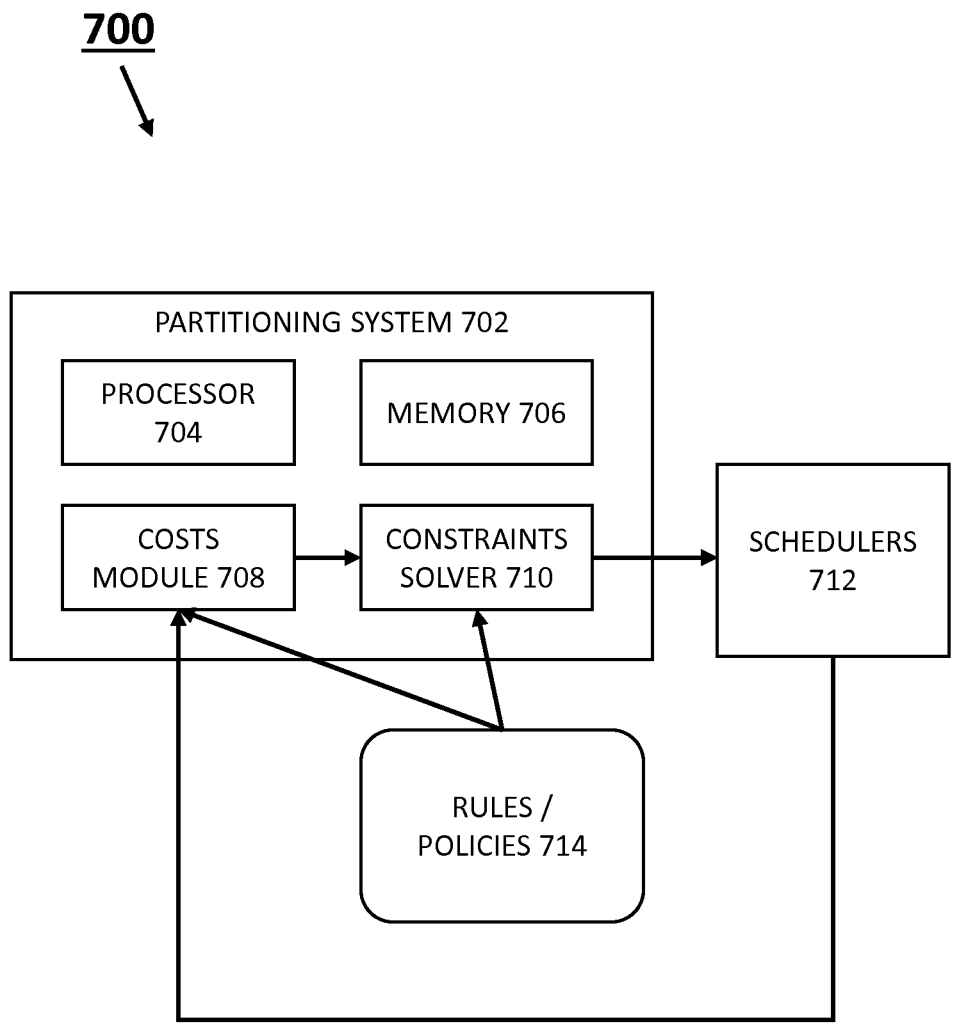
FIG. 7 shows an exemplary system for determining virtual machine assignment for reducer tasks on physical hosts, according to some embodiments of the disclosure.

FIG. 7 shows an exemplary system for implementing the improved partitioning method, e.g., determining virtual machine assignment for reducer tasks on physical hosts, according to some embodiments of the disclosure. The system 700 includes a partitioning system 702. Partitioning system 702 includes one or more processors 704 and one or more memory elements 706. Memory element 706 can store data and instructions for facilitating any of the partitioning functions therein. Partitioning system 702 further includes costs module 708 and constraints solver 710, that when executed by the at least one processors 704 are configured to a constraints solver that when executed by the at least one processor is configured to perform any one or more parts of the partitioning method (such as the method illustrated by FIG. 2).

System 700 further includes one or more schedulers 712 which can keep track of the states of the resources and instruct resources to perform certain tasks. For instance, the scheduler 712 may be configured to implement MapReduce using various VMs. In some cases, the scheduler 712 can provide storage management. Examples of schedulers include Neutron, Cinder, and Nova. In system 700, the costs module 708 interfaces with one or more schedulers 712. For instance, the costs module 708 can be configured to determine a distribution of keys, and states associated with hosts, virtual machines, network links, network topology, etc. The costs module 708 can provide a repository for (updated) states of resources in the virtual cloud infrastructure. Generally speaking, the costs module 708 can gather information usable for determining one or more cost matrices.

System 700 also includes a rules/policies part 714 that can interface with tenant or administrators who may want to constrain the partitioning method. Costs module 708 can interface with rules/policies part 714, e.g., if certain rules/policies may affect cost function definitions. Furthermore, the constraints solver 710 may interface with rules/policies part 714 to determine one or more constraints for the constraints optimization problem. Using the cost matrices from costs module 708, and constraints determined from rules/policies part 714, constraints solver 710 can determine optimized assignments of reducer VMs to reducer tasks. Accordingly, the constraints solver 710 can interface with schedulers 712 to execute those optimized assignments.

The improved partitioning method and system advantageously provide a smart resource placement decision making engine that is universally applicable for many kinds of resource placement decisions, and can communicate with all the services (e.g., such as varied cloud infrastructure components usable with OpenStack). The improved partitioning method and system can solve for minimizing (or maximizing) certain optimization metrics while satisfying a set of constraints. The framework lends itself easily to help satisfy tenant APIs that could allow a tenant to specify the resource request, along with business rules and policies (which can translate to complex constraints usable by the partitioning framework).

Trade-Off for Waiting Until Map Tasks are Complete

One aspect of the improved partitioning method involves providing dynamic assignment/placement of reducers after the map tasks are done instead of a priori assignment/placement. Requiring that all the map tasks are complete is not a performance issue. If the number of keys produced by all the mappers is small, the overall reducer time is small anyway; if the number of keys produced is large, making the reducer placement decision after all the map tasks are complete adds only a small amount to the overall completion time. Note that even if the reducer tasks are started a priori, they cannot start execution until all the map tasks are complete. It is also understood by one skilled in the art that the time for solving the optimization problem is generally far less than the time an inefficient partitioning method would have Variations and Implementations While the above disclosure describes a matrix having certain variables in the rows and certain variables in the columns, it is understood by one skilled in the art that the rows and columns can be switched for an equivalent implementation.

The embodiments disclosed herein are intended to illustrate how a constraints solver can be used to optimize reducer VM assignments to keys. One skilled in the art would appreciate that other embodiments are envisioned where one or more assumptions/simplifications can be made to make the optimization problem less complicated. Furthermore, one skilled in the art would appreciate that other combination of constraints can be applied depending on the application while leveraging the advantages of the present embodiments.

Generally, the improved partitioning method is performed after the map tasks are complete. However, in some cases, the improved partitioning method is performed once a distribution of keys can be estimated (but the map tasks are not necessarily complete). Furthermore, embodiments generally assume that that the mapper VMs are already created and the mapper VMs are able to run the reducer tasks as reducer VMs. However, it is envisioned that not all the mapper VMs are able to run the reducer tasks as reducer VMs, especially if some of the mapper VMs are scheduled to perform other tasks.

If network distance is part of the (aggregate) cost, one skilled in the art can expect that a measure of network distance between two virtual machines (i.e., the respective hosts that is running the two virtual machines) can be determined or estimated from the physical topology of hosts in the cloud infrastructure.

In some cases, the constraints optimization problem may require one VM per reducer or mapper, but it is envisioned that the optimization problem is applicable in situations where a VM can run multiple reducers or mappers.

To further simplify matters, some embodiments can assume that the time to complete a reducer task is directly proportional to the number of (key-value) pairs assigned to it. However, it is envisioned that some variations of the present disclosure can estimate the time to complete a reducer task differently (e.g., based on further factors).

Within the context of the disclosure, a network used herein represents a series of points, nodes, or network elements of interconnected communication paths for receiving and transmitting packets of information that propagate through a communication system. A network offers communicative interface between sources and/or hosts, and may be any local area network (LAN), wireless local area network (WLAN), metropolitan area network (MAN), Intranet, Extranet, Internet, WAN, virtual private network (VPN), or any other appropriate architecture or system that facilitates communications in a network environment depending on the network topology. A network can comprise any number of hardware or software elements coupled to (and in communication with) each other through a communications medium. As used herein in this Specification, the term 'network element' is meant to encompass any of the aforementioned elements, as well as partitioning systems, servers (physical or virtual), end user devices, routers, switches, cable boxes, gateways, bridges, loadbalancers, firewalls, inline service nodes, proxies, processors, modules, or any other suitable device, component, element, proprietary appliance, or object operable to exchange, receive, and transmit information in a network environment. These network elements may include any suitable hardware, software, components, modules, interfaces, or objects that facilitate the partitioning operations thereof. This may be inclusive of appropriate algorithms and communication protocols that allow for the effective exchange of data or information.

In one implementation, partitioning systems described herein may include software to achieve (or to foster) the functions discussed herein for determining optimized assignment of reducer VMs to reducer tasks where the software is executed on one or more processors to carry out the functions. This could include the implementation of instances of costs modules, constraints solvers, and/or any other suitable element that would foster the activities discussed herein. Additionally, each of these elements can have an internal structure (e.g., a processor, a memory element, etc.) to facilitate some of the operations described herein. In other embodiments, these functions for partitioning may be executed externally to these elements, or included in some other network element to achieve the intended functionality. Alternatively, partitioning systems may include software (or reciprocating software) that can coordinate with other network elements in order to achieve the functions described herein. In still other embodiments, one or several devices may include any suitable algorithms, hardware, software, components, modules, interfaces, or objects that facilitate the operations thereof.

In certain example implementations, the partitioning functions outlined herein may be implemented by logic encoded in one or more non-transitory, tangible media (e.g., embedded logic provided in an application specific integrated circuit [ASIC], digital signal processor [DSP] instructions, software [potentially inclusive of object code and source code] to be executed by one or more processors, or other similar machine, etc.). In some of these instances, one or more memory elements can store data used for the operations described herein. This includes the memory element being able to store instructions (e.g., software, code, etc.) that are executed to carry out the activities described in this Specification. The memory element is further configured to store databases or data structures such as variable matrices, cost matrices, states of resources, constraints, etc., disclosed herein. The processor can execute any type of instructions associated with the data to achieve the operations detailed herein in this Specification.

In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, partitioning systems, etc.) can include memory elements for storing information to be used in achieving improved partitioning method, as outlined herein. Additionally, each of these devices may include a processor that can execute software or an algorithm to perform the improved partitioning method as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Additionally, it should be noted that with the examples provided above, interaction may be described in terms of two, three, or four parts. However, this has been done for purposes of clarity and example only. In certain cases, it may be easier to describe one or more of the functionalities of a given set of flows by only referencing a limited number of network elements. It should be appreciated that the systems described herein are readily scalable and, further, can accommodate a large number of components, as well as more complicated/sophisticated arrangements and configurations. Accordingly, the examples provided should not limit the scope or inhibit the broad techniques of partitioning, as potentially applied to a myriad of other architectures.

It is also important to note that the steps in the FIG. 2 illustrate only some of the possible scenarios that may be executed by, or within, the partitioning systems described herein. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by partitioning systems in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method for determining and executing optimal virtual machine assignments for reducer tasks on physical hosts, the method comprising:
- determining a distribution of keys over mapper virtual machines after map tasks are complete, wherein the distribution of keys comprises, for each key and for each mapper virtual machine, a number of key-value pairs for the particular key stored with the particular mapper virtual machine;
- determining costs associated with assignments of virtual machines to reducer tasks on the keys based on the distribution of keys;
- defining a variable matrix for assigning virtual machines to reducer tasks, wherein the variable matrix comprises values indicating whether a virtual machine is to be assigned to reduce one or more keys, and the variable matrix has dimensions of at least n by (M+p*q), where n is the number of keys, M is the number of mapper virtual machines, p is n−M, and q is the number of available physical hosts on which a virtual machine can be created;
- determining the optimal virtual machine assignments for the reducer tasks, using a constraints solver, based on the variable matrix and the costs, subject to one or more constraints on the variable matrix; and
- assigning, according to the optimal virtual machine assignments, the reducer tasks for execution by the virtual machines on the physical hosts.

2. The method of claim 1, wherein the assignments of virtual machines to the reducer tasks comprises assignments of the mapper virtual machines to reducer tasks and assignments of virtual machines to be created on available physical hosts to reducer tasks.

3. The method of claim 1, wherein the optimal assignments comprises assignments of virtual machines to be created on available physical hosts to reducer tasks.

4. The method of claim 3 further comprises creating the virtual machines on available physical hosts according to the optimal assignments.

5. The method of claim 1, wherein the costs associated with assignments of virtual machines to reducer tasks comprises, for each virtual machine and for each reducer task, a cost for the particular virtual machine to perform the particular reducer task.

6. The method of claim 1, wherein determining the costs associated with the assignments of virtual machines to reducer tasks comprises computing, for each virtual machine and for each reducer task, a cost for performing a particular reducer task for a particular key using a particular virtual machine based on the distribution of keys over the mapper virtual machines.

7. The method of claim 6, wherein the cost for performing the particular reducer task for the particular key is computed based at least on network distance(s) from the virtual machine(s) on which the key-value pairs for the particular key is stored to the particular virtual machine performing the reducer task for the particular key.

8. The method of claim 6, wherein the cost for performing the particular reducer task for the particular key is computed based at least on processor utilization of the particular virtual machine performing the reducer task for the particular key.

9. The method of claim 6, wherein the cost for performing the particular reducer task for the particular key is computed based at least on memory utilization of the particular virtual machine performing the reducer task for the particular key.

10. The method of claim 6, wherein the cost for performing the particular reducer task for the particular key is computed based at least on bandwidth availability(-ies) of the communication path from the virtual machine(s) on which the key-value pairs for the particular key is stored to the particular virtual machine performing the reducer task for the particular key.

11. The method of claim 6, wherein the cost for performing the particular reducer task for the particular key is computed based at least on disk input/output speeds of the particular virtual machine performing the reducer task for the particular key.

12. The method of claim 1, wherein the one or more constraints comprises one or more of the following:
(1) a virtual machine is assigned to at most one reducer task;
(2) a reducer task for a particular key is assigned to only one virtual machine; and
(3) if a reducer task is assigned to a virtual machine to be created on a physical host, the virtual machine is created on only one physical host.

13. The method of claim 1, wherein the one or more constraints comprises one or more of the following, if a virtual machine is capable of performing up to a predefined number of reducer task(s):
(1) a reducer task for a particular key is assigned to only one virtual machine; and
(2) if a reducer task is assigned to a virtual machine to be created on a physical host, the virtual machine is created on only one physical host.

14. A system for determining and executing optimal virtual machine assignments for reducer tasks on physical hosts comprising:
- at least one memory element;
- at least one processor coupled to the at least one memory element;
- a costs module that when executed by the at least one processor is configured to:
- determine a distribution of keys over mapper virtual machines after map tasks are complete, wherein the distribution of keys comprises, for each key and for each mapper virtual machine, a number of key-value pairs for the particular key stored with the particular mapper virtual machine; and
- determine costs associated with assignments of virtual machines to reducer tasks on the keys based on the distribution of keys;
- defining a variable matrix for assigning virtual machines to reducer tasks, wherein the variable matrix comprises values indicating whether a virtual machine is to be assigned to reduce one or more keys, and the variable matrix has dimensions of at least n by (M+p*q), where n is the number of keys, M is the number of mapper virtual machines, p is n−M, and q is the number of available physical hosts on which a virtual machine can be created; and a constraints solver that when executed by the at least one processor is configured to:
determine the optimal virtual machine assignments for the reducer tasks based on the variable matrix and the costs, subject to one or more constraints on the variable matrix; and
providing the optimal virtual machine assignments for the reducer tasks to a scheduler to execute the optimal virtual machine assignments on the physical hosts.

15. The system of claim 14, wherein the assignments of virtual machines to the reducer tasks comprises assignments of the mapper virtual machines to reducer tasks and assignments of virtual machines to be created on available physical hosts to reducer tasks.

16. A computer-readable non-transitory medium comprising one or more instructions, for determining and executing optimal virtual machine assignments for reducer tasks on physical hosts, that when executed on a processor configure the processor to perform one or more operations comprising:
determining a distribution of keys over mapper virtual machines after map tasks are complete, wherein the distribution of keys comprises, for each key and for each mapper virtual machine, a number of key-value pairs for the particular key stored with the particular mapper virtual machine;
determining costs associated with assignments of virtual machines to reducer tasks on the keys based on the distribution of keys;
defining a variable matrix for assigning virtual machines to reducer tasks, wherein the variable matrix comprises values indicating whether a virtual machine is to be assigned to reduce one or more keys, and the variable matrix has dimensions of at least n by (M+p*q), where n is the number of keys, M is the number of mapper virtual machines, p is n−M, and q is the number of available physical hosts on which a virtual machine can be created;
determining the optimal virtual machine assignments for the reducer tasks, using a constraints solver, based on the variable matrix and the costs, subject to one or more constraints on the variable matrix; and
assigning, according to the optimal virtual machine assignments, the reducer tasks for execution by the virtual machines on the physical hosts.

17. The computer-readable non-transitory medium of claim 16, wherein:
the optimal assignments comprises assignments of virtual machines to be created on available physical hosts to reducer tasks; and
the one or more operations further comprise creating the virtual machines on available physical hosts according to the optimal assignments.

18. The computer-readable non-transitory medium of claim 16, wherein determining the costs associated with the assignments of virtual machines to reducer tasks comprises computing, for each virtual machine and for each reducer task, a cost for performing a particular reducer task for a particular key using a particular virtual machine based on the distribution of keys over the mapper virtual machines.

19. The computer-readable non-transitory medium of claim 16, wherein the one or more constraints comprises one or more of the following:
(1) a virtual machine is assigned to at most one reducer task;
(2) a reducer task for a particular key is assigned to only one virtual machine; and
(3) if a reducer task is assigned to a virtual machine to be created on a physical host, the virtual machine is created on only one physical host.

20. The computer-readable non-transitory medium of claim 16, wherein the one or more constraints comprises one or more of the following, if a virtual machine is capable of performing up to a predefined number of reducer task (s):
(1) a reducer task for a particular key is assigned to only one virtual machine; and
(2) if a reducer task is assigned to a virtual machine to be created on a physical host, the virtual machine is created on only one physical host.

* * * * *